WS007813363B2

(12) United States Patent
Lee et al.

(10) Patent No.: US 7,813,363 B2
(45) Date of Patent: Oct. 12, 2010

(54) NETWORK INTERFACE CONTROLLING LOCK OPERATION IN ACCORDANCE WITH ADVANCED EXTENSIBLE INTERFACE PROTOCOL, PACKET DATA COMMUNICATION ON-CHIP INTERCONNECT SYSTEM INCLUDING THE NETWORK INTERFACE, AND METHOD OF OPERATING THE NETWORK INTERFACE

(75) Inventors: Beom Hak Lee, Seoul (KR); Eui Seok Kim, Suwon-si (KR); Sang Woo Rhim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 480 days.

(21) Appl. No.: 11/472,323

(22) Filed: Jun. 22, 2006

(65) Prior Publication Data

US 2007/0147379 A1    Jun. 28, 2007

(30) Foreign Application Priority Data

Dec. 22, 2005    (KR) .................... 10-2005-0127558

(51) Int. Cl.
*H04L 12/28* (2006.01)
*G06F 15/00* (2006.01)
*G06F 12/00* (2006.01)

(52) U.S. Cl. .................... 370/412; 712/31; 710/200
(58) Field of Classification Search .................. 710/200

See application file for complete search history.

(56) References Cited

U.S. PATENT DOCUMENTS 5,161,227 A * 11/1992 Dias et al. .................... 718/104
5,983,225 A * 11/1999 Anfindsen .................... 707/8
6,088,757 A *  7/2000 Boonie et al. ................ 710/200
6,141,720 A * 10/2000 Jeffords et al. ............... 710/200
6,629,288 B1 *  9/2003 Bernath et al. ............... 714/807
6,789,153 B1 *  9/2004 Stewart ....................... 710/306
7,062,589 B1 *  6/2006 Crosland ..................... 710/306
7,447,946 B2 * 11/2008 McHale et al. ............... 714/45

FOREIGN PATENT DOCUMENTS

WO    WO 2005/103934 A1    11/2005

OTHER PUBLICATIONS

Arm Limited, Prime Cell® AXI Configurable Interconnect (PL300), Technical Reference Manual, [Online], Oct. 26, 2005, pp. I-2-13, XP002454110, Retrieved from the Internet: URL:http://infocenter.arm.com/help/topic/com.arm.doc.ddi0354b/DDI0354.pdf>, [retrieved on Oct. 8, 2007, paragraph [2.1.6].
Arm, "Amba AXI Protocol V1.0 Specification", Internet Citation [Online] 2003. XP002342105, Retrieved from the Internet: URL: http://www.arm.com/products/solutions/axi_spec.html> [retrieved on Aug. 24, 2005].

* cited by examiner

*Primary Examiner*—Daniel J Ryman
*Assistant Examiner*—Cassandra Decker
(74) *Attorney, Agent, or Firm*—Sughrue Mion, PLLC

(57) ABSTRACT

A packet data communication on-chip interconnect system is provided including a network interface efficiently controlling a transaction performed between at least one master intellectual property (IP) block and at least one slave IP block connected via a Network on a Chip (NoC). According to an aspect of the present invention, traffic functioning and throughput of the entire NoC may be improved by appropriately controlling an operation of performing a lock operation according to an Advance eXtensible Interface (AXI) protocol in the network interface of the packet data communication on-chip interconnect system.

10 Claims, 7 Drawing Sheets

NETWORK INTERFACE CONTROLLING LOCK OPERATION IN ACCORDANCE WITH ADVANCED EXTENSIBLE INTERFACE PROTOCOL, PACKET DATA COMMUNICATION ON-CHIP INTERCONNECT SYSTEM INCLUDING THE NETWORK INTERFACE, AND METHOD OF OPERATING THE NETWORK INTERFACE

CROSS-REFERENCE TO RELATED APPLICATIONS

This application claims priority from Korean Patent Application No. 10-2005-0127558, filed on Dec. 22, 2005, in the Korean Intellectual Property Office, the disclosure of which is incorporated herein by reference.

BACKGROUND OF THE INVENTION

1. Field of the Invention

The present invention relates to a packet data communication on-chip interconnect system, and more particularly, to a network interface efficiently controlling transaction performed between at least one master intellectual property (IP) block and at least one slave IP block connected via a Network on a Chip (NoC), and a packet data communication on-chip interconnect system including the network interface.

2. Description of the Related Art

An Advanced Microcontroller Bus Architecture (AMBA) Advanced extensible Interface (AXI) protocol is a more suitable bus protocol for a high-speed/high-end system than a related art on-chip bus protocol and has channels associated with read, write, address, and write response, which are respectively separated, individually operated, and have transaction properties such as multiple-outstanding address, write data interleaving.

An NoC is a network style on-chip interconnect system manufactured to overcome structural defects of a related art bus structural on-chip interconnect system. A high-speed/high-end/low power System on a Chip (SoC) may be embodied via the NoC. According to a packet data communication mode defined to support an AXI protocol in the NoC 100, a plurality of Intellectual Property (IP) blocks 110 shown in FIG. 1 may perform efficient data processing via packet routing of an NoC backbone 120.

Figure 1:
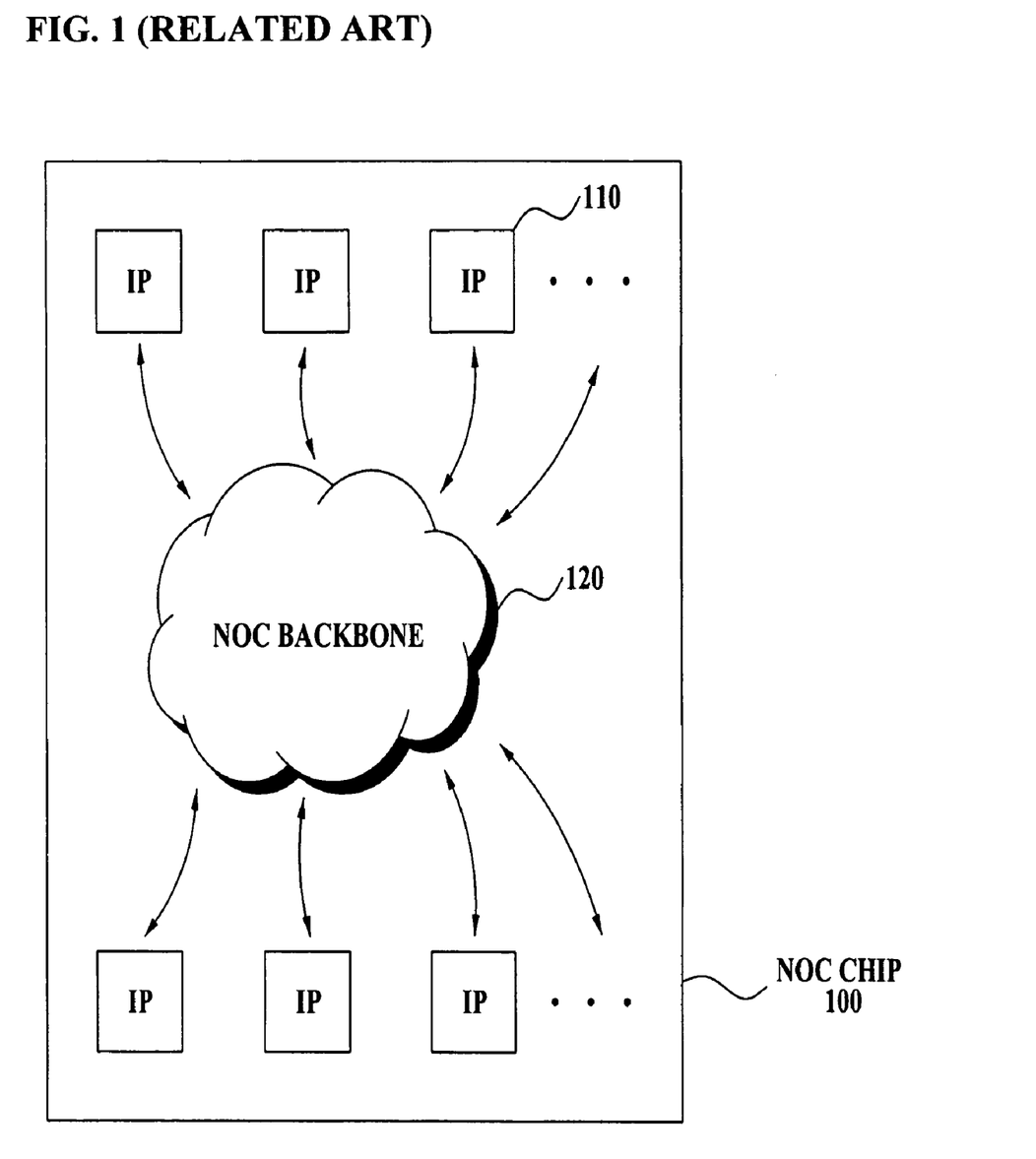
FIG. 1 is a schematic diagram illustrating a related art general packet data communication on-chip interconnect system.

In designing a packet data communication on-chip interconnect system shown in FIG. 1, a system designer may variously design the blocks 110 or the NoC backbone 120 according to the AXI protocol. The AXI protocol may be easily applied to any field such as not only a point-to-point system but also a multilayer system, via an interface between at least one master IP block and at least one slave IP block. Particularly, since the AXI protocol supports multi-transaction elegantly, parallel burst transmission is possible, thereby improving throughput. Therefore, a particular operation may be performed for a short time and various operations are performed by a plurality of IP blocks integrated in one chip, thereby reducing power consumption.

According to the AXI protocol, a master IP block is cross connected to a slave IP block via a network interface, when a lock operation is performed between one master IP block and the slave IP block, an arbiter in an interconnect system may control a transaction input from another master IP block to the slave IP block until an unlock transfer is issued from the master IP block requesting a lock access. However, in a packet data communication on-chip interconnect system, since a master IP block is connected to an NoC backbone via a network interface and is connected to a destination slave IP block via at least one router included in the NoC backbone, there is no centralized data transfer controller between the master IP block and the slave IP block.

As described above, since the centralized data transfer controller does not exist in the packet data communication on-chip interconnect system, when the packet data communication interconnect system supports a lock operation defined by the AXI protocol, problems described below may occur.

When a lock sequence is transferred from a second master IP block to a slave IP block while a transaction is performed between a first master IP block and the slave IP block, according to the AXI protocol, a lock access requested by the second master IP block may not be accepted. In this case, the second master IP block has to wait for a ready response with respect to the lock access for a predetermined amount of time or has to retransfer the lock sequence when the ready response is not received, thereby generating a delay in processing a certain task and dropping a traffic efficiency of an NoC backbone.

When a transaction including a lock sequence is input from a second master IP block to a slave IP block while a lock operation is performed between a first master IP block and the slave IP block, according to the AXI protocol, the lock operation performed between the first master IP block and the slave IP block fails. In this case, the slave IP block has to transfer a SLVERR response with respect to the lock sequence to the first master IP block and the first master IP block has to retransfer the lock sequence to the slave IP block to perform the lock operation from the beginning again. Therefore, with an increase of traffic of an NoC backbone, efficiency of utilizing a resource of the first master IP block may be decreased.

SUMMARY OF THE INVENTION

An aspect of the present invention provides a method of supporting a lock operation in a packet data communication on-chip interconnect system including a plurality of master IP blocks and a plurality of slave IP blocks transferring data via network interface, centering around an NoC backbone.

An aspect of the present invention provides a packet data communication on-chip interconnect system efficiently controlling a lock operation performed between a master IP and a slave IP An aspect of the present invention also provides a packet data communication on-chip interconnect system which adds a simple operation logic to a network interface.

An aspect of the present invention also provides a packet data communication on-chip interconnect system in which traffic efficiency of the entire NoC as well as throughput may be improved.

According to an aspect of the present invention, there is provided a network interface of a packet data communication on-chip interconnect system, the network interface including: a state controller which monitors a transaction between a slave IP block and at least one master IP block connected via a Network on a Chip (NoC) backbone; and a buffer which buffers a data burst input from the master IP block, wherein, when a lock sequence is received from a second master IP block while the slave IP block transacts with a first master IP block, the state controller controls the buffering of the lock sequence received from the second master IP block in the buffer, and when the transaction between the slave IP block and the first master IP block is completed, the state controller controls the lock sequence buffered in the buffer to be transferred to the slave IP block.

According to another aspect of the present invention, there is provided a network interface of a packet data communication on-chip interconnect system, the network interface including: a state controller which monitors a transaction between a slave IP block and at least one master IP block connected via an NoC backbone; and a buffer which buffers a data burst input from the master IP block; and a response generation unit which generates an error response according to control of the state control unit, wherein, when the data burst is input from a second master IP block while the slave IP block is in a lock operation with a first master IP block, the state controller controls discarding the data burst buffered in the buffer, the generating of the error response by the response generating unit, and transferring the error response transferred to the second master IP block via the NoC backbone.

BRIEF DESCRIPTION OF THE DRAWINGS

The above and/or other aspects of the present invention will become apparent and more readily appreciated from the following detailed description, taken in conjunction with the accompanying drawings of which.

DETAILED DESCRIPTION OF THE INVENTION

Reference will now be made in detail to the exemplary embodiments of the present invention, examples of which are illustrated in the accompanying drawings, wherein like reference numerals refer to the like elements throughout. The exemplary embodiments are described below to explain the present invention by referring to the figures.

Figure 2:
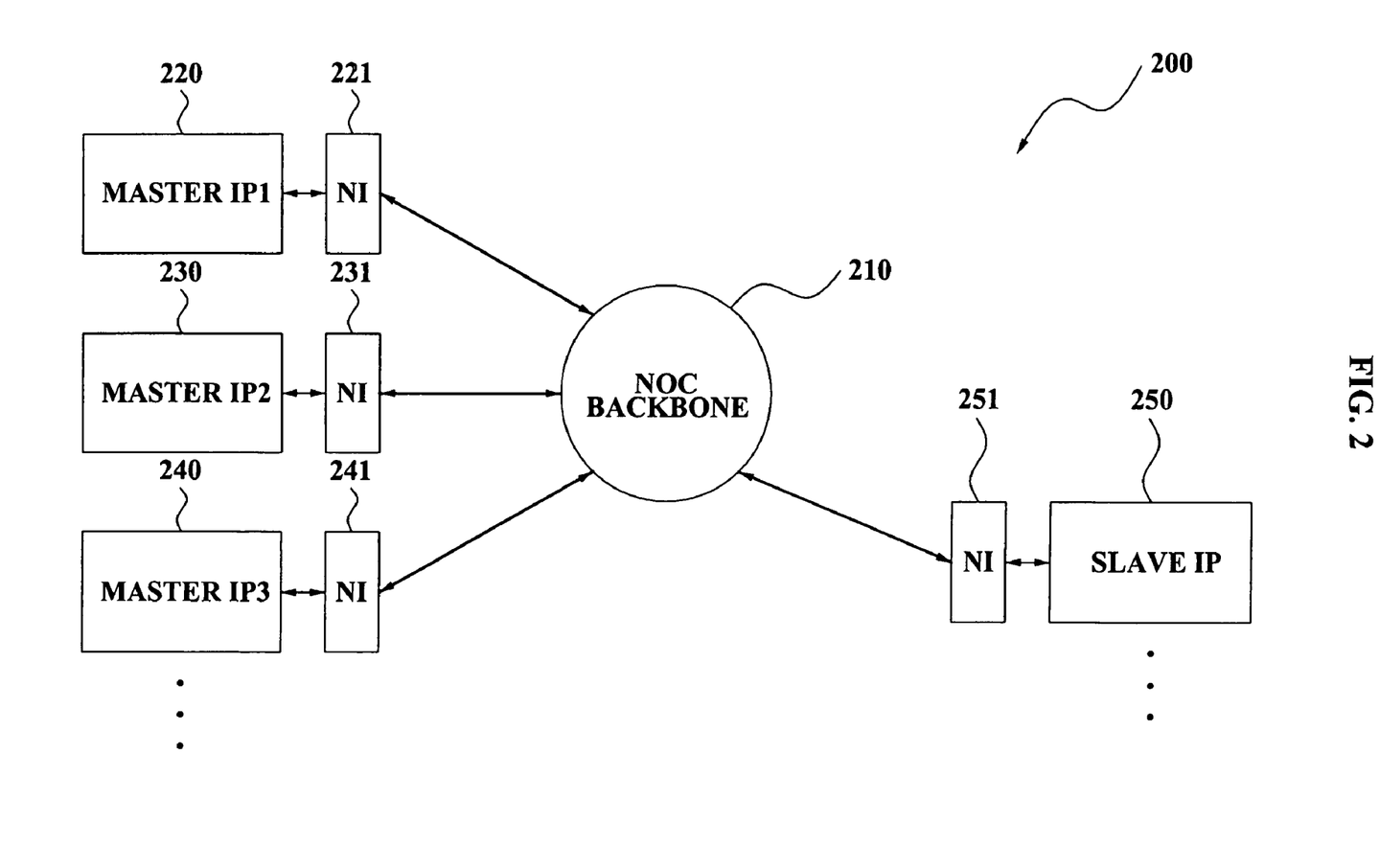
FIG. 2 is a diagram illustrating connection relations of IP blocks included in a packet data communication on-chip interconnect system.

FIG. 2 is a diagram illustrating a packet data communication on-chip interconnect system 200 according to an exemplary embodiment of the present invention.

Referring to FIG. 2, the packet data communication on-chip interconnect system 200 includes a Network on-Chip (NoC) backbone 210 and at least one IP block 220 to 250 performing a series of processes according to an AXI protocol.

As shown in FIG. 2, each of the IP blocks 220 to 250 accesses the NoC backbone 210 to perform a transaction with other IP blocks or to be connected to network interfaces (NIs) 221, 231, 241, and 251 interfacing a data burst transferred from other IP blocks.

Master IP blocks 220, 230 and 240 perform transactions with a slave IP block 250 via at least one router (not shown) included in the NoC backbone 210. The NoC backbone 210 routes a packet or a flit according to the AXI protocol, between a plurality of the IP blocks 220 to 250.

For example, the master IP blocks 220, 230 and 240 may transfer packet data formed of a header and a payload to the slave IP block 250 and may record or read data from the slave IP block 250. The NoC backbone 210 routes the packet data transferred between the master IP blocks 220, 230 and 240 and the slave IP block 250 with reference to a destination address included in the packet data. The described packet may be transferred after being divided into a predetermined size of a flit. In the present specification, the data transferred between several IP blocks via the NoC backbone 210 is transferred in a form of a packet or flit and the packet or flit data transferred via the NoC backbone 210 may be designated by a data burst.

Similar to a general high-speed communication packet theory, the header of the packet data may include a data length, lock information, a source identification (ID), a destination ID, and a packet type, such as a data read/write request. Also, the payload may include an address of a slave IP block in which data is read or written, and data. Particularly, when lock access request information is included in the header, a flit input from another IP block may not be input to the slave IP block performing the lock operation while a master IP block communicates with the slave IP block and may be input to the relevant IP block after the lock operation is finished by an unlock transfer issued from the master IP block.

Since the described type of communication between the master IP block and the slave IP block has already been disclosed in a prior publication related to the AXI protocol, detailed description thereof will be omitted and only a detailed configuration according to the present invention in the present specification will be described. Also, though packet data is transferred according the AXI protocol in the packet data communication on-chip interconnect system according to the present exemplary embodiment in the present specification, it can also be applied to a packet data communication on-chip interconnect system operating by other protocols supporting a lock operation, such as Advanced High-performance Bus (AHB) protocol or Advanced Peripheral Bus (APB) protocol in addition to the AXI protocol.

In the packet data communication on-chip interconnect system 200, the NIs 221, 231, 241, and 251 of each of the IP blocks 220 to 250, for example, the NI 251 of the slave IP block 250 buffers a lock sequence input from other master IP blocks while performing transaction with a particular master IP block or generates an error response with respect to a data burst input from other IP blocks and transfers the error response to the master IP block inputting the data burst while performing a lock operation with a particular master IP block. There are problems of the described related art technology, namely, a case in which a lock sequence is input from the master IP1 220 while performing transaction between the master IP2 230 and the slave IP block 250.

Figure 3:
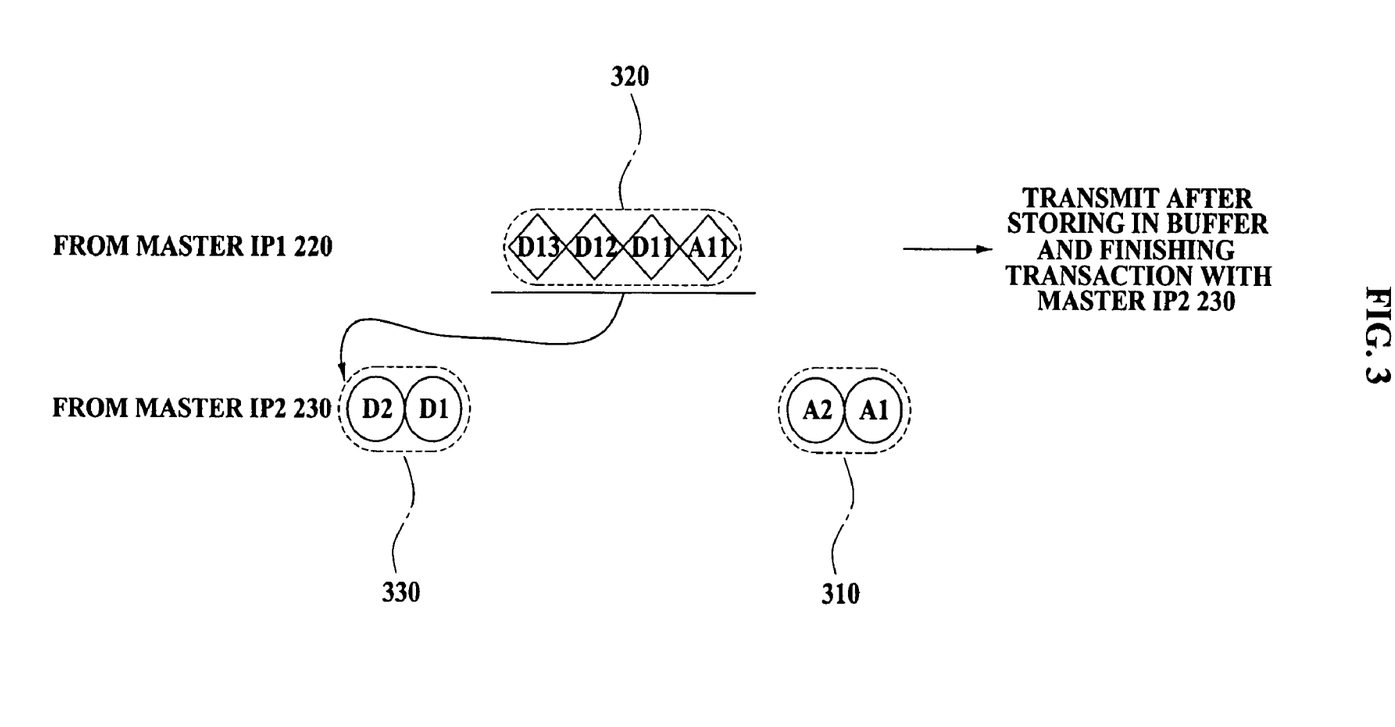
FIG. 3 is a diagram illustrating an operation theory of a network interface according to an exemplary embodiment of the present invention.

Referring to FIG. 3, an operation of the network interface of the packet data communication on-chip interconnect system according to an exemplary embodiment of the present invention will be schematically described below.

As shown in FIG. 3, the master IP2 230 transfers a flit burst 310 formed of addresses A1 and A2 to the slave IP block 250, and the master IP1 220 inputs a lock sequence burst 320 to the slave IP block 250 while transferring a flit burst formed of data D1 and D2. According to the related art technology, the lock sequence burst 320 input from the master IP1 220 is not accepted. Accordingly, the master IP1 220 has to wait for a ready response with respect to a lock access request for a predetermined amount of time or has to again transfer a lock sequence burst 320 when the response is not received from the slave IP block 250. The network interface 251 according to the present exemplary embodiment buffers the lock sequence burst 320 input from the master IP1 220 in a buffer and transfers the buffered lock sequence burst 320 to the slave IP block 250. In FIG. 3, as transaction performed with the master IP2 230, a maximum length of a burst is 2 and flits including an address and data are divided and transferred into two bursts.

Figure 4:
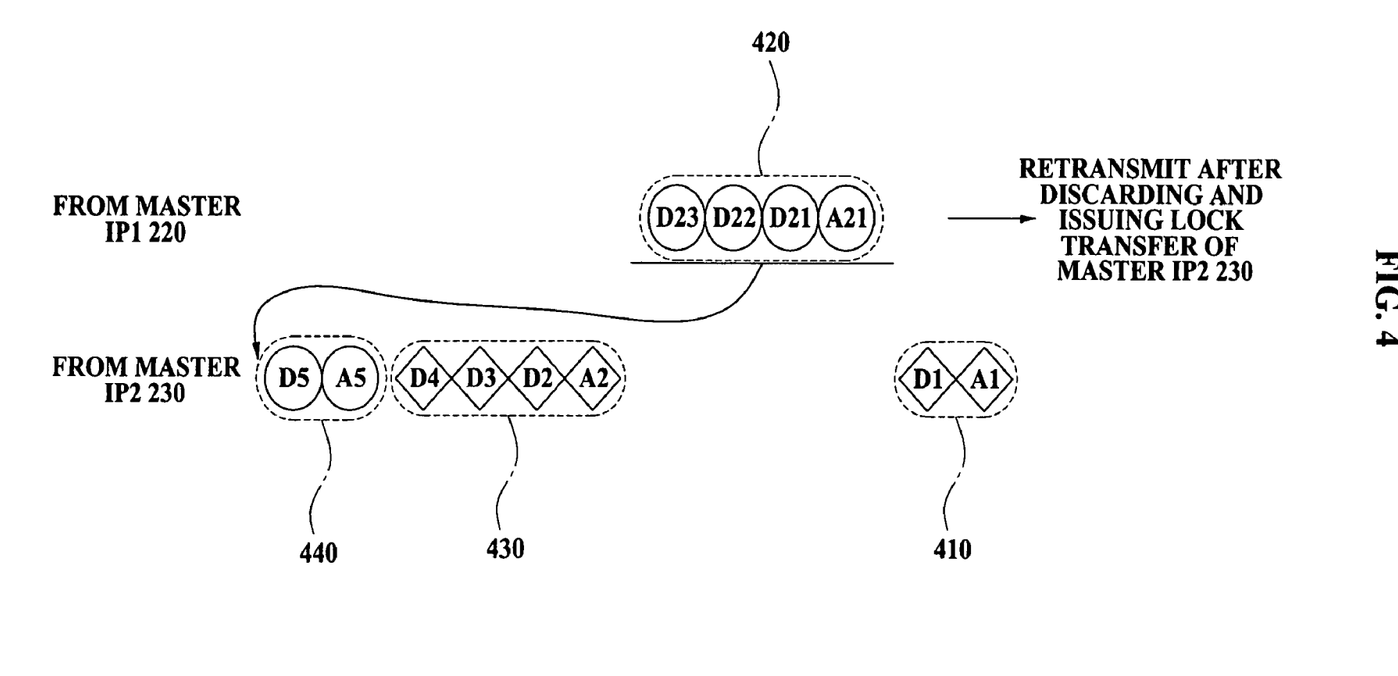
FIG. 4 is a diagram illustrating an operation theory of a network interface according to another exemplary embodiment of the present invention.

Referring to FIG. 4, an operation of the network interface of the packet data communication on-chip interconnect system according to another exemplary embodiment of the present invention will be schematically described below.

Referring to FIG. 4, a case in which the master IP 220 tries to perform a transaction with the slave IP block 250 while a lock operation is performed between the master IP2 230 and the slave IP block 250 is illustrated.

In FIG. 4, after a lock operation starts with transferring a lock flit burst 410, formed of the address A1 and the data D1, to the slave IP block 250 by the master IP2 230, the master IP1 220 tries to transfer a flit burst 420 formed of an address A21 and data D21, D22, and D23 to the slave IP block 250. The master IP2 230 only transfers the lock flit burst 410 and does not transfer a lock flit burst 430. The slave IP block 250 operates in a lock operation mode with the master IP2 230 until an unlock transfer 440 is issued from the master IP2 230. In this case, when the flit burst 420 is input from the master IP1 220, the lock operation fails according to the AXI protocol. Accordingly, the network interface 251 discards the flit burst 420 transferred from the master IP1 220 and generates and transfers an error response to the master IP1 220. The master IP1 220 receiving the error response may retransfer the flit burst 420 to the slave IP block 250 after the unlock transfer 440 is issued from the master IP2 230. In FIG. 4, though the discarded flit burst 420 is described as a normal flit, the operation may be applied to a case in which a flit burst transferred from the master IP1 220 is a lock sequence. Also, the error response described with reference to FIG. 4 may be, for example, a slave error response (SLVERR) that is one of AXI protocol responses.

Figure 5:
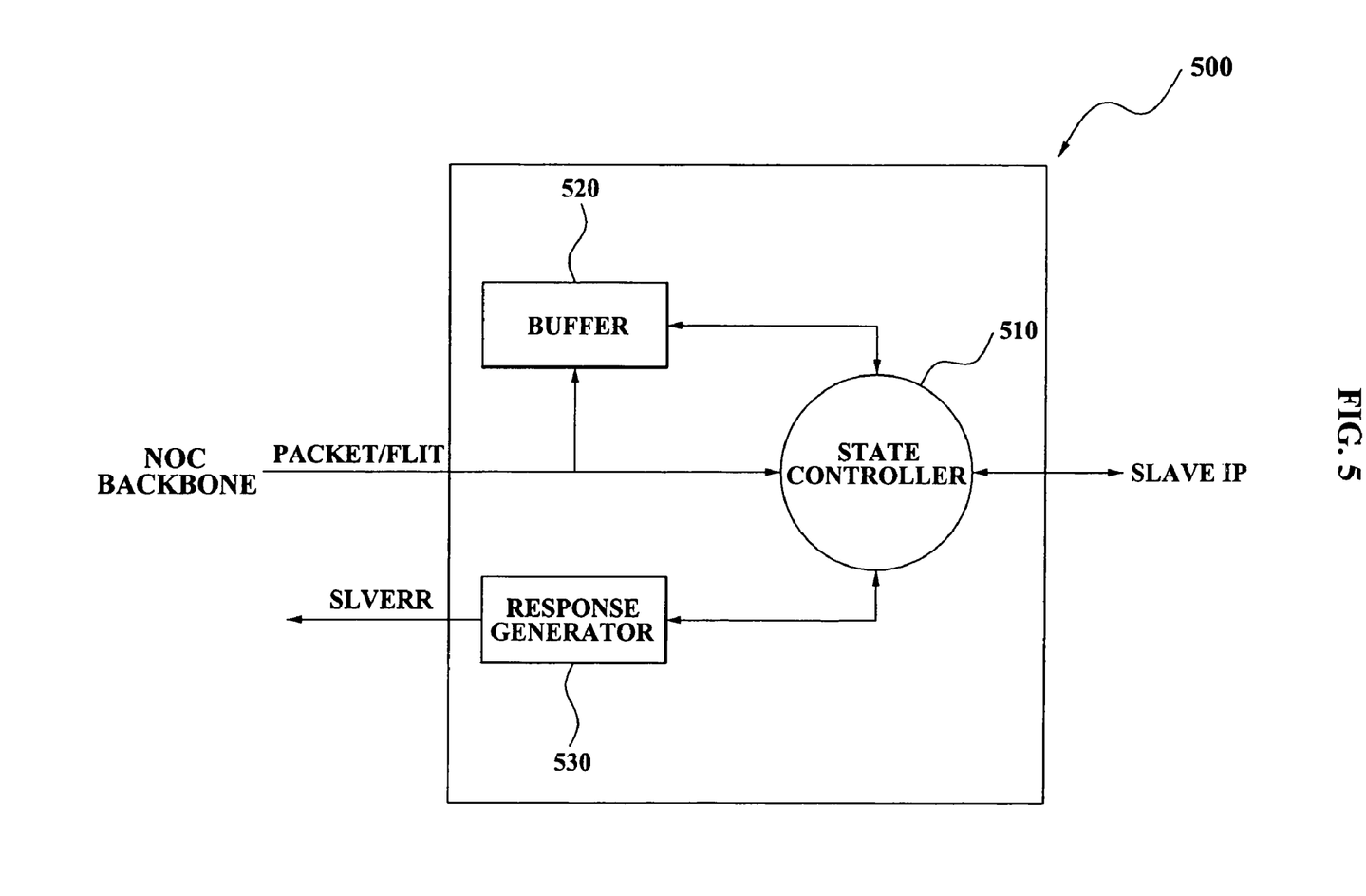
FIG. 5 is a block diagram illustrating a configuration of a network interface according to an exemplary embodiment of the present invention.

FIG. 5 is a block diagram illustrating a configuration of the network interface according to an exemplary embodiment of the present invention.

Referring to FIG. 5, the network interface of a group of slave IP blocks included in the packet data communication on-chip interconnect system includes a state controller 510, a buffer 520, and a response generator 530. In FIG. 5, though the configuration of the network interface capable of supporting the operation theory of the network interface according to the embodiments of the present invention described with reference to FIGS. 3 and 4, those skilled in the art would readily recognize that the network interface may include the state controller 510 and the buffer 520 or the state controller 510 and the response generator 530.

As described above, the network interface 500 included in the packet data communication on-chip interconnect system processes data transactions between the NoC backbone 210 and the IP blocks 220 to 250 operating as a master or a slave. Methods of operating the network interface 500 (hereinafter, referred to as the NI 500) according to the present exemplary embodiment will be described below with reference to FIGS. 6 and 7.

Figure 6:
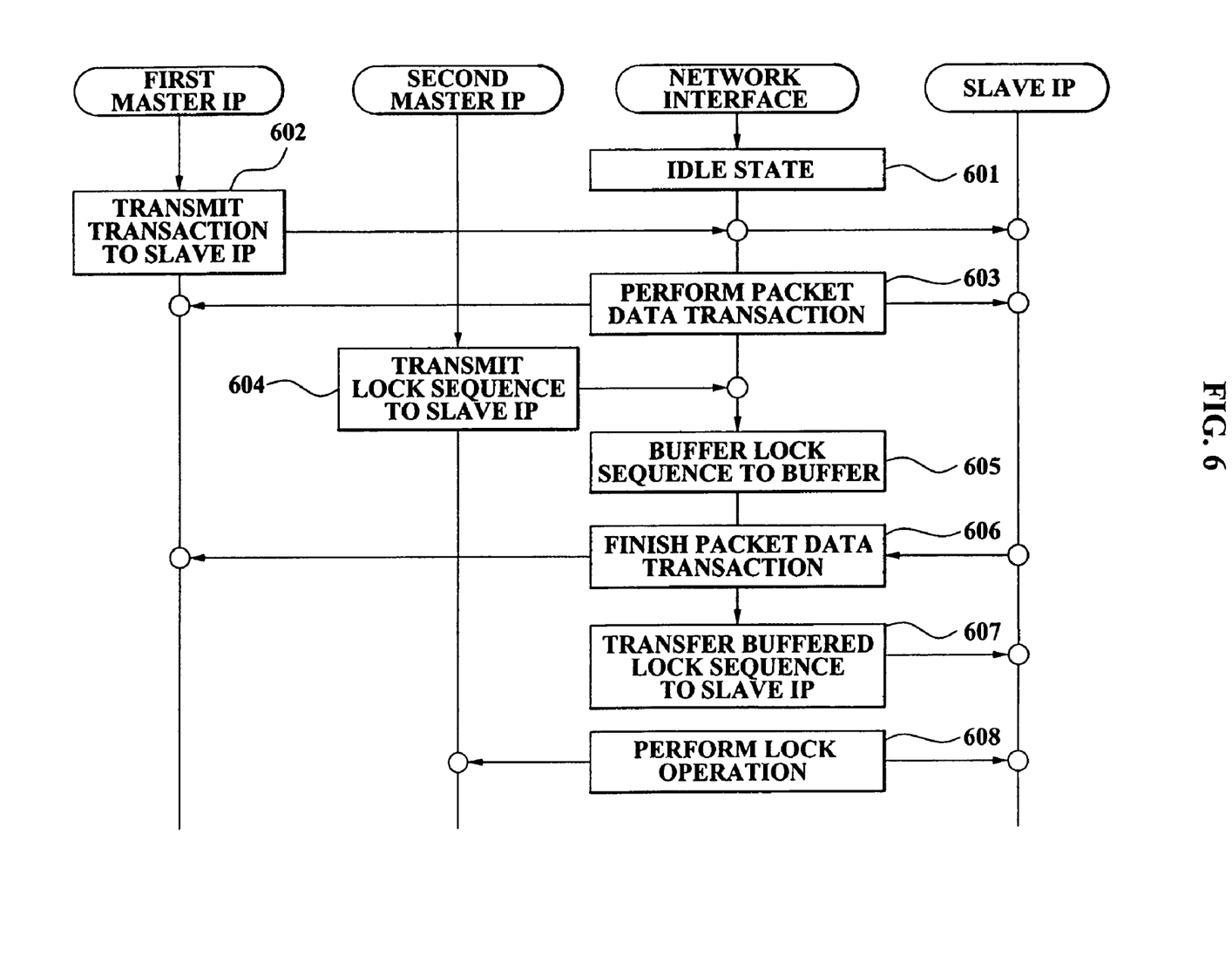
FIG. 6 is a flowchart illustrating an operation method of the network interface according to an exemplary embodiment of the present invention.

FIG. 6 is a flowchart illustrating an operation method of the network interface according to an exemplary embodiment of the present invention.

The NI 500 is in an idle state in which transaction with a master IP block or a slave IP block is not performed (601). The NI 500 receives a data burst from a first master IP block and transfer the data burst to a slave IP block (602), and packet data transaction is performed (603).

When a lock sequence is input from a second master IP block while the transaction is performed between the first master IP block and the slave IP block (604), the NI 500 buffers the input lock sequence to the buffer 520 (605). When the transaction is performed between the first master IP block and the slave IP block, the state controller 510 controls the buffering of the lock sequence input from the second master IP block to the NI 500.

When the transaction between the first master IP block and the slave IP block is finished (606), the NI 500 transfers the lock sequence buffered to the buffer 520 to the slave IP block (607). According to the transferred lock sequence, the slave IP block transfers a ready response to the second master IP block and a lock operation is performed between the second master IP block and the slave IP block (608).

Figure 7:
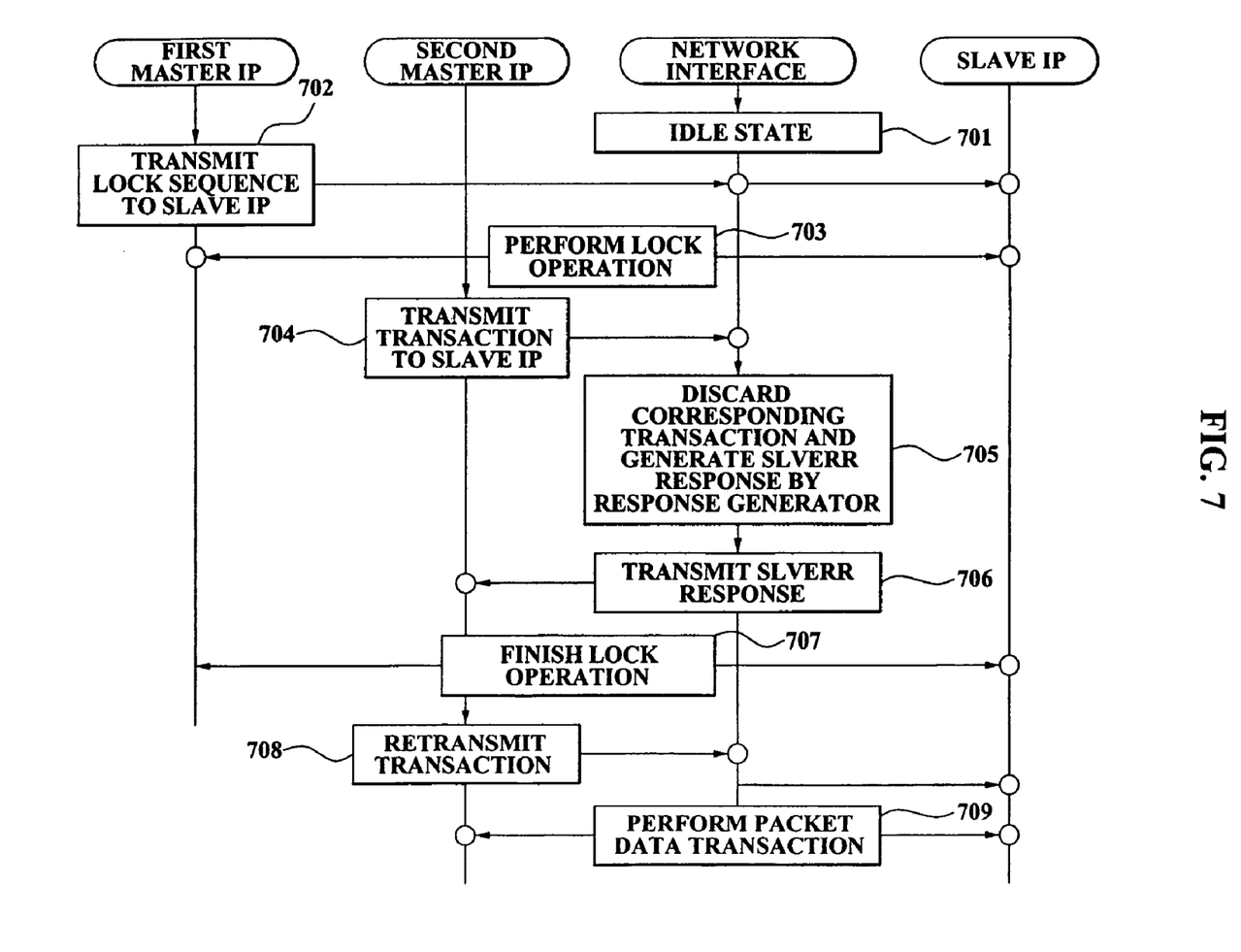
FIG. 7 is a flowchart illustrating an operation method of the network interface according to another exemplary embodiment of the present invention.

FIG. 7 is a flowchart illustrating an operation method of the network interface according to another exemplary embodiment of the present invention.

The NI 500 is in an idle state in which transaction with a master IP block or a slave IP block is not performed (701). The NI 500 receives a lock sequence from a first master IP block (702) and transfers the lock sequence to the slave IP block via the NI 500, and the lock operation is performed (703).

When a flit burst is input from the second master IP block (704) while the lock operation is performed, the state controller 510 controls discarding of the received flit burst and the response generator 530 to generate a SLVERR response (705). The generated SLVERR response is transferred to the second master IP block (706). When an unlock transfer is issued from the first master IP block and the lock operation is finished (707), the second master IP block retransfers the flit burst transferred in 704 (708). The flit burst transferred from the second master IP block is transferred to the slave IP block via the NI 500, and the second master IP block and the slave IP block transfer and receive the flit burst and perform transaction (709).

The function used in the method and apparatus disclosed in the present specification can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A network interface of a packet data communication on-chip interconnect system, the network interface comprising:
    a state controller which monitors a transaction between a slave Intellectual Property (IP) block and at least two master IP blocks connected via a Network on a Chip (NoC) backbone; and
    a response generation logic unit stored in memory which generates an error response according to control by the state controller,
    wherein, when a transaction is input from a second master IP block of the at least two master IP blocks while the slave IP block is in a lock operation with a first master IP block of the at least two master IP blocks, the state controller controls discarding of the transaction input from the second master IP block, and the response generation logic unit to generate the error response, and transferring the error response to the second master IP block via the NoC backbone,
    wherein the second master IP block receives the error response generated by the response generation logic unit and retransfers the transaction input from the second master IP block to the slave IP block when an unlocked transfer is issued from the first master IP block.

2. The network interface of claim 1, wherein the error response generated by the response generation logic unit is a slave error response that is a response signal of an advanced extensible interface protocol.

3. The network interface of claim 1, wherein the transaction input from the second master IP block is a lock sequence.

4. The network interface of claim 1, wherein the network interface supports at least one of an advanced high-performance bus protocol, an advanced peripheral bus protocol, and an advanced extensible interface protocol.

5. A packet data communication on-chip interconnect system comprising:
    at least two master IP blocks;
    at least one slave IP block;
    an NoC backbone comprising at least one router which controls packet data transmission between a first master IP block of the at least two master IP blocks and the at least one slave IP block;
    a plurality of first network interfaces each of which interfaces a respective one of the at least two master IP blocks with the NoC backbone; and
    a second network interface which interfaces the at least one slave IP block with the NoC backbone, the second network interface comprising:
    a state controller which monitors a transaction between the at least one slave IP block and the first master IP block connected via the NoC backbone; and
    a response generation logic unit stored in memory which generates an error response according to control by the state controller,
    wherein when a transaction is input from a second master IP block of the at least two master IP blocks while the at least one slave IP block is in a lock operation with the first master IP block, the state controller controls discarding the transaction input from the second master IP block, the response generation logic unit to generate the error response, and transferring the error response to the second master IP block via the NoC backbone,
    wherein the second master IP block receives the error response generated by the response generation logic unit and retransfers the transaction to the at least one slave IP block when an unlocked transfer is issued from the first master IP block.

6. The system of claim 5, wherein the error response generated by the response generation logic unit is a slave error response that is a response signal of an advanced extensible interface protocol.

7. The system of claim 5, wherein the first and second network interfaces support at least one of an advanced high-performance bus protocol, an advanced peripheral bus protocol, and an advanced extensible interface protocol.

8. A method of processing packet data in a network interface of a packet data communication on-chip interconnect system, the method comprising:
    monitoring transactions between a slave IP block and at least two master IP blocks connected via an NoC backbone;
    when a transaction is input from a second master IP block of the at least two master IP blocks while a lock sequence burst is transferred from a first master IP block of the at least two master IP blocks to the slave IP block, discarding the transaction input from the second master IP block;
    generating an error response by a response generation logic unit stored in memory; and
    transferring the error response to the second master IP block via the NoC backbone, wherein the second master IP block receives the error response generated by the response generation logic unit and retransfers the transaction input from the second master IP block to the slave IP block when an unlocked transfer is issued from the first master IP block.

9. The method of claim 8, wherein the network interface supports at least one of an advanced high-performance bus protocol, an advanced peripheral bus protocol, and an advanced extensible interface protocol.

10. A Network on a Chip comprising a memory storing a state machine comprising modules for processing packet data in a network interface of a packet data communication on-chip interconnect system, the state machine comprising:
    a monitoring module configured to monitor transactions between a slave IP block and at least two master IP blocks connected via an NoC backbone;
    a discarding module configured to, when a transaction is input from a second master IP block of the at least two master IP blocks while a lock sequence burst is transferred from a first master IP block of the at least two master IP blocks to the slave IP block, discard the transaction input from the second master IP block;
    a generating module configured to generate an error response; and
    a transferring module configured to transfer the error response to the second master IP block via the NoC backbone,
    wherein the second master IP block receives the error response generated by the generating module and retransfers the transaction input from the second master IP block to the slave IP block when an unlocked transfer is issued from the first master IP block.

* * * * *